(12) United States Patent
Iles

(10) Patent No.: US 6,357,989 B1
(45) Date of Patent: Mar. 19, 2002

(54) AIRCRAFT-WHEEL LIFTING DEVICE

(76) Inventor: Frank Iles, Loscombe Farm, Loscome Lane Four Lanes, Redruth TR16 6LP (GB)

( * ) Notice: Subject to any disclaimer, the term of this patent is extended or adjusted under 35 U.S.C. 154(b) by 0 days.

(21) Appl. No.: 09/171,693

(22) PCT Filed: Apr. 24, 1997

(86) PCT No.: PCT/GB97/01139

§ 371 Date: Jul. 12, 1999

§ 102(e) Date: Jul. 12, 1999

(87) PCT Pub. No.: WO97/39947

PCT Pub. Date: Oct. 30, 1997

(30) Foreign Application Priority Data

Apr. 25, 1996 (GB) .............................................. 9608561

(51) Int. Cl.[7] .................................................. B64F 1/22
(52) U.S. Cl. ...................... 414/428; 294/119.1; 244/50; 414/563; 414/426; 280/402
(58) Field of Search ................. 414/563, 426, 414/427, 428, 429, 430, 911; 280/402; 180/904, 14.7; 294/103.1, 104, 119.1; 244/50; 254/2 R

(56) References Cited

U.S. PATENT DOCUMENTS

| | | | | | |
|---|---|---|---|---|---|
| 3,021,167 | A | * | 2/1962 | Ostdiek | .................... 294/119.1 |
| 3,472,401 | A | * | 10/1969 | Scaperotto | ........... 284/119.1 X |
| 4,375,244 | A | * | 3/1983 | Morin | ..................... 414/429 X |
| 5,104,279 | A | * | 4/1992 | Melnick | ...................... 414/428 |
| 5,302,076 | A | * | 4/1994 | Bammel et al. | ............. 414/428 |
| 5,314,287 | A | * | 5/1994 | Wichert | ...................... 414/427 |
| 5,336,037 | A | * | 8/1994 | Cüten et al. | ................. 414/429 |

FOREIGN PATENT DOCUMENTS

| | | | |
|---|---|---|---|
| DE | 33 27629 A1 | 2/1985 | |
| DE | 89 11372-1 | 1/1990 | |
| EP | 000331363 | * 9/1989 | ................. 414/426 |

* cited by examiner

*Primary Examiner*—Frank E. Werner
(74) *Attorney, Agent, or Firm*—Steinberg & Raskin, P.C.; Grant E. Pollack

(57) ABSTRACT

A device and method for lifting an aircraft wheel assembly. The device comprises first and second wheel-engaging supports connectable to a bearing structure and rotatable relative to one another between open and wheel-cradling configurations, the device further comprising an actuator connected to the bearing structure to enable raising or lowering of the supports relative to the ground when in the wheel-cradling configuration.

15 Claims, 6 Drawing Sheets

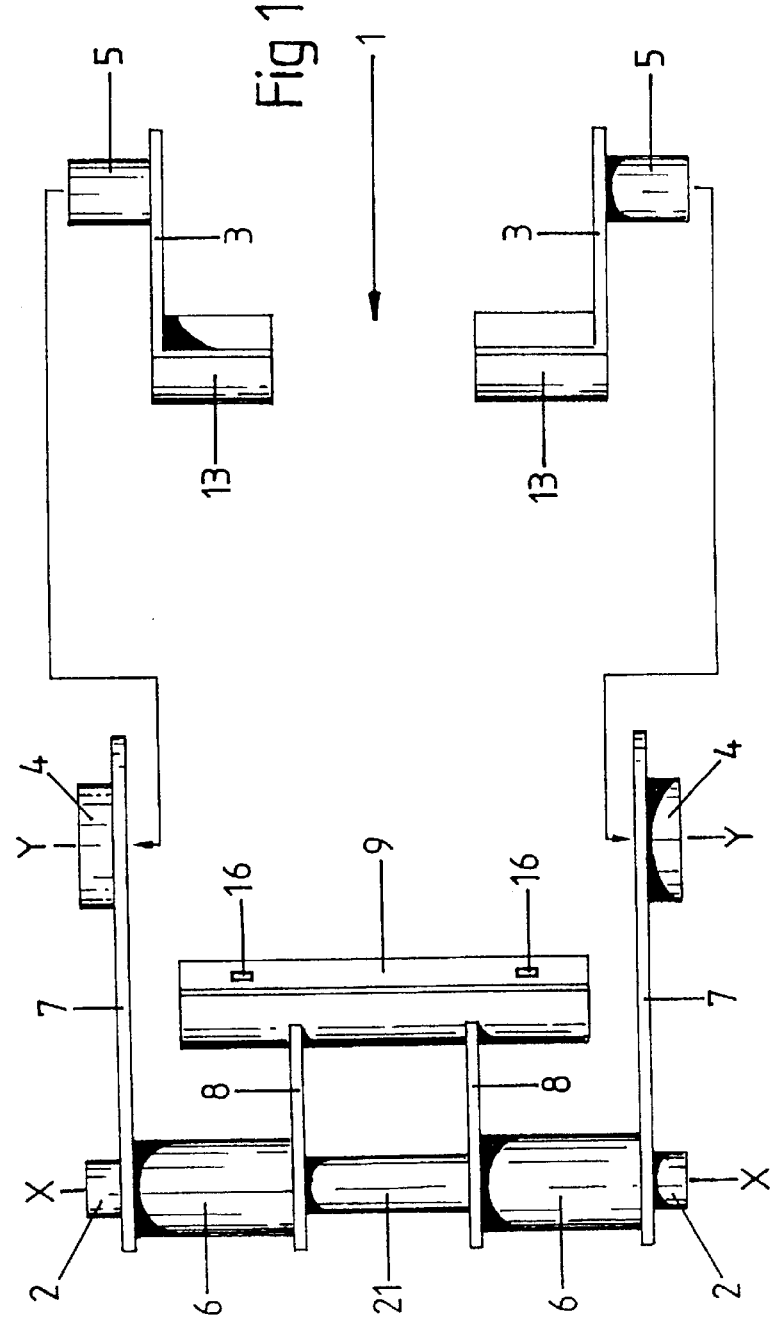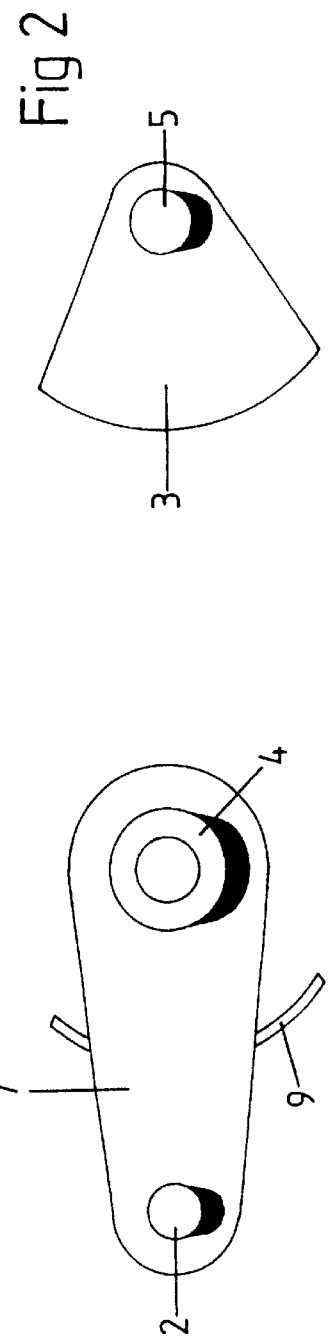

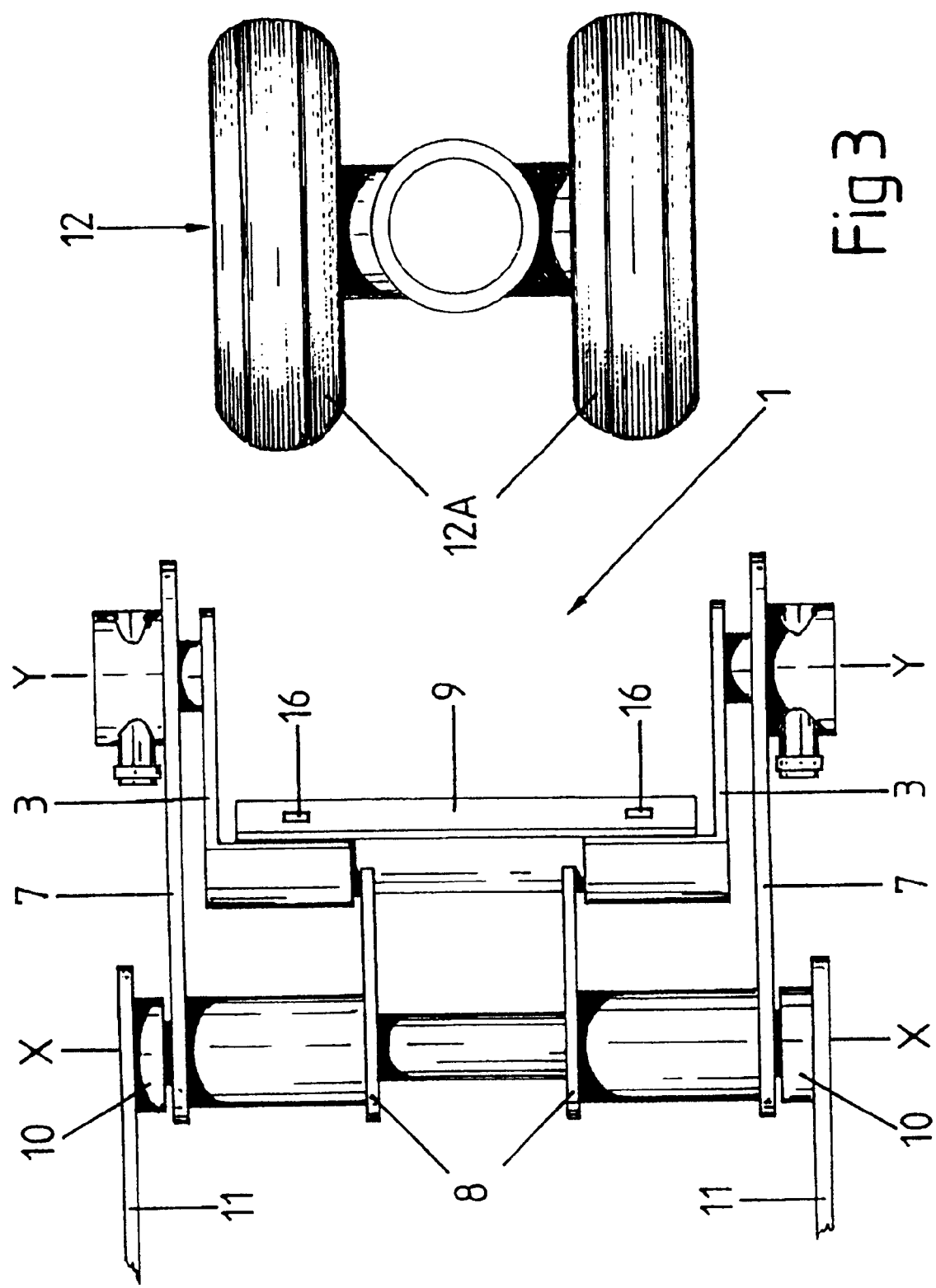

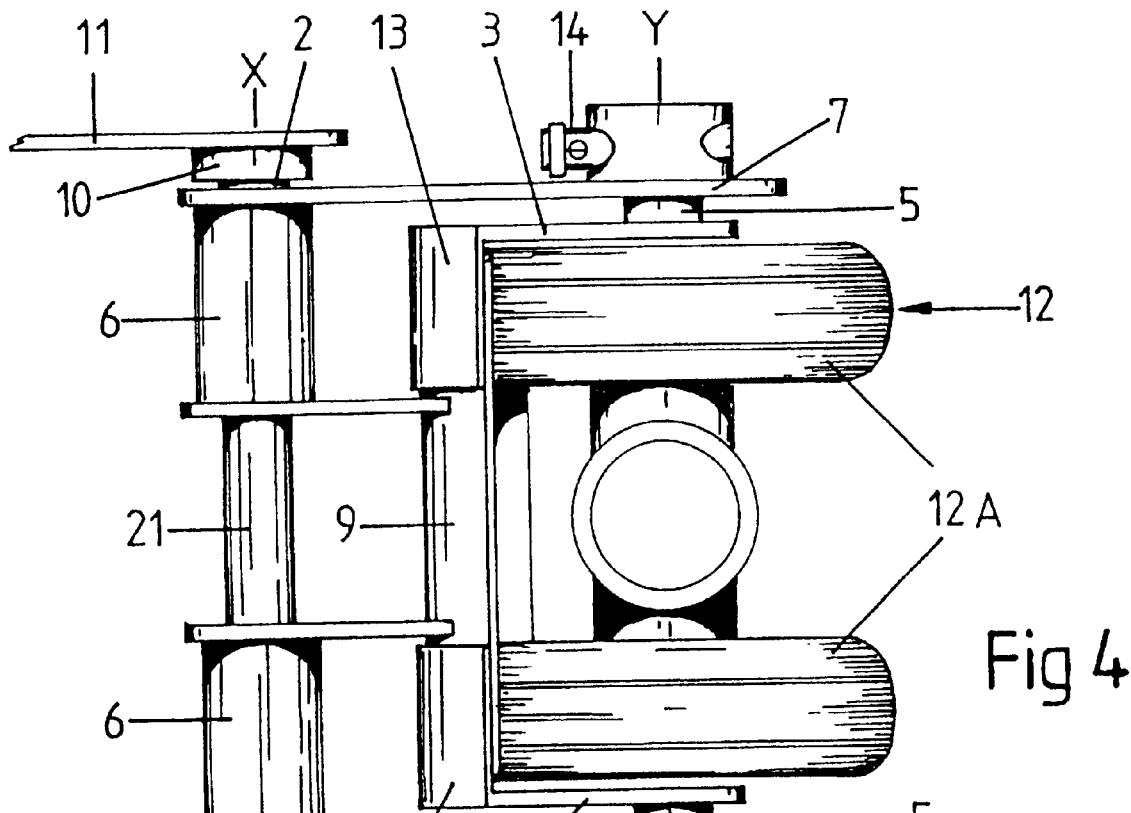
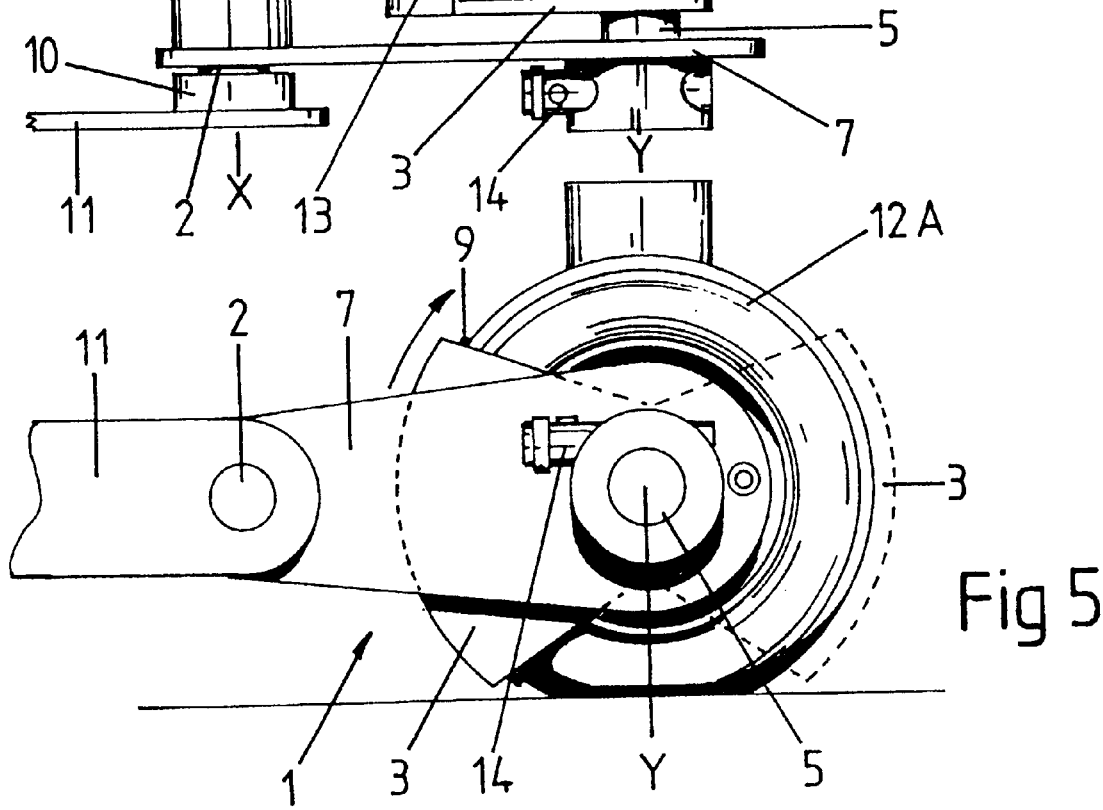

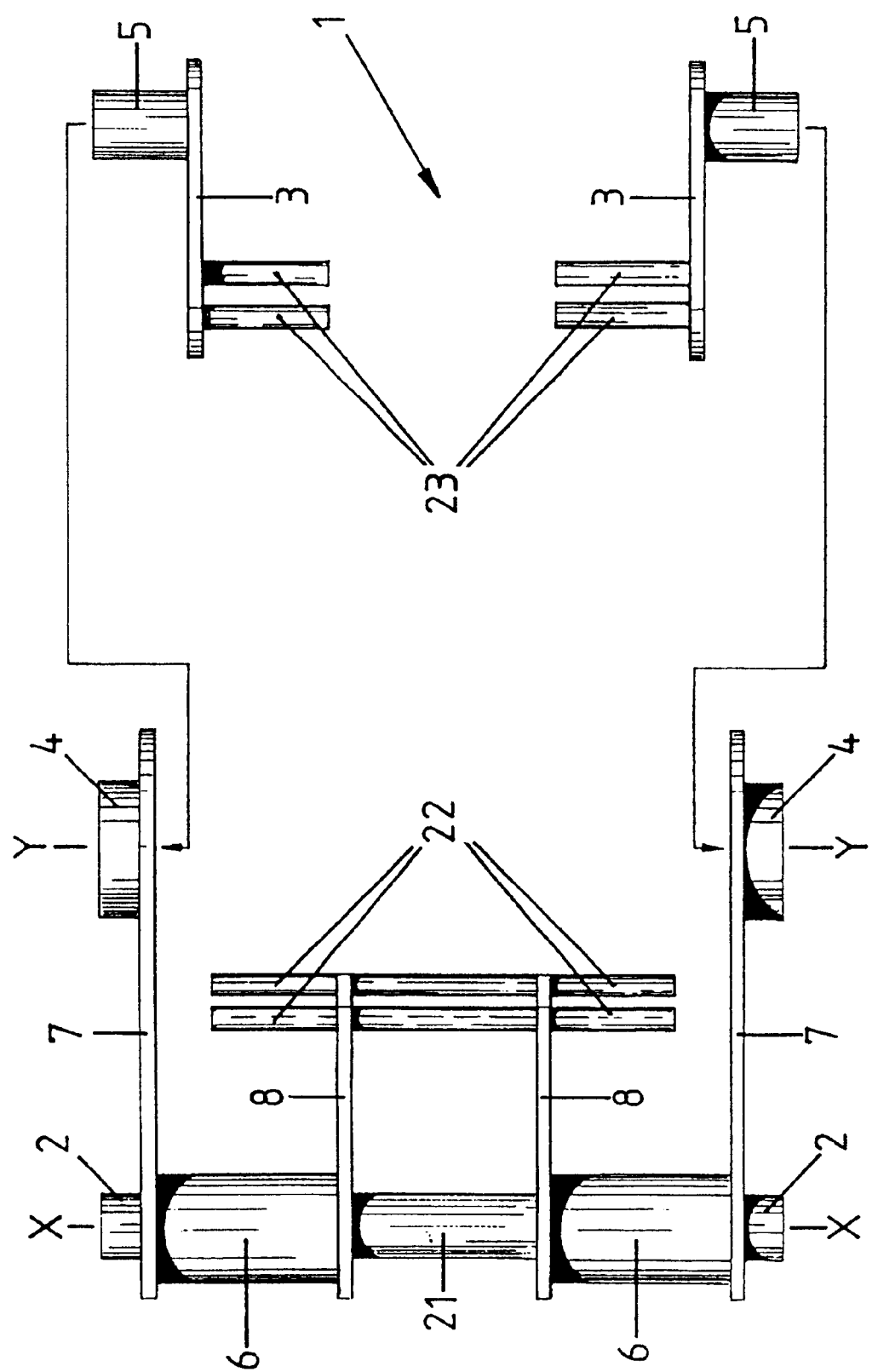

AIRCRAFT-WHEEL LIFTING DEVICE

DISCLOSURE OF THE INVENTION

The present invention relates generally to aircraft ground handling systems and, more particularly, to a device for lifting an aircraft wheel assembly.

According to one aspect of the present invention, there is provided a device for lifting a wheel assembly of an aircraft, such as a twin nose-wheel assembly, for aircraft ground handling purposes. The device comprises first and second wheel supports which are rotatable relative to one another between a first configuration in which a first portion of the aircraft wheel circumference can be located against the first support and a second configuration in which the second support is brought against a second portion of the wheel circumference, opposite the first portion, to cradle the wheel, the supports being raisable and lowerable in the second configuration.

Although the present invention is shown and described as a self-propelled towing dolly or the like, the device, it is understood, may also constitute part of an aircraft ground handling machine or the like, giving consideration to the purpose for which the present invention is intended. It is preferred, alternatively or concurrently therewith, that the device also include a connection to a bearing structure or chassis of an aircraft ground handling machine to enable raising and lowering of the wheel support and wheel cradled thereby.

According to another aspect of the present invention, there is provided an aircraft ground handling machine, such as a towing dolly or a tractor, having a device according to the first aspect of the invention.

For instance, at least one of the wheel supports is constituted by wheel engaging surfaces, and comprise a fixed support which defines the first support surface and a movable support which defines the second support surface and is rotatable relative to the fixed support. Alternatively or concurrently, the wheel supports may each comprise laterally-disposed and vertically spaced-apart pins which define notional wheel-engaging surfaces but which have an advantage of having utility irrespective of the diameter of the wheel. The supports may also be rotatable relative to one another about an axis which is substantially vertical in the normal condition of use, so that the supports close like a jaw laterally around the wheel.

Preferably, the movable wheel supports rotate relative to the fixed wheel support about a transverse axis which is substantially horizontal in the normal condition of use, the movable support being disposed on the same side of the wheel as the fixed support (that is, adjacent the first portion of the wheel circumference) in the first configuration and being swung over the wheel into the second configuration so that, in the second configuration, the movable supports are disposed on the opposite side of the wheel from the fixed support. Where the wheel supports comprise wheel-engaging surfaces, they are preferably curved surfaces which are concentric or substantially concentric about the transverse axis. Alternatively or concurrently therewith, the wheel supports, as indicated above, comprise pins which may be carried by side plates for location and rotation purposes relative to the wheel and may be themselves rotatable or may carry rotatable sleeves.

It is preferred, such as in the case of lifting of a twin nosewheel assembly, the first support surface of the fixed wheel support corresponds substantially in width to the overall width of the twin nosewheel and is engagable by the two wheels thereof. It is also preferred in this context that the movable wheel support comprise two members which are rotatable in unison over respective wheels of the twin nosewheel assembly, on either side of the central nosewheel strut, commonly known as an oleo leg, and each of which defines a respective second support surface portion engagable with the respective wheel in the second configuration.

It is further preferred that, on the first support surface, there be two pressure switches operable by the two wheels of the twin nosewheel to enable rotation of at least one movable wheel support, the pressure switches being in positions such that they can both be operated to enable rotation of the movable support only when the twin nosewheel is correctly positioned against the first support surface. This prevents the movable wheel support from operating in a misaligned condition of the nosewheel and hence from fouling the nosewheel.

Accordingly, it is an object of the present invention to provide ready lifting of an aircraft nosewheel assembly for improved transport of aircraft which is not only suitable for use in confined (and unconfined) areas, but also durable, reliable and economical.

The present invention will now be further described by reference to the following drawings which are not intended to limit the accompanying claims.

FIG. 1 is a partially exploded, plan view of a device for lifting a wheel of an aircraft, according to one aspect of the present invention;

FIG. 2 is a side view of the device of FIG. 1;

FIG. 3 is a plan view of the device of FIG. 1 in an initial operating condition;

FIG. 4 is a plan view of the device of FIG. 1 in a subsequent operating condition according to the present invention;

FIG. 5 is a side view of the device of FIG. 1 in the subsequent operating condition;

FIG. 10 is a plan view, corresponding to FIG. 1, showing another variant of the device in FIG. 1.

The same numerals are used throughout the drawing figures to designate similar elements. Still other objects and advantages of the present invention will become apparent from the following description of the preferred embodiments.

Figure 6:
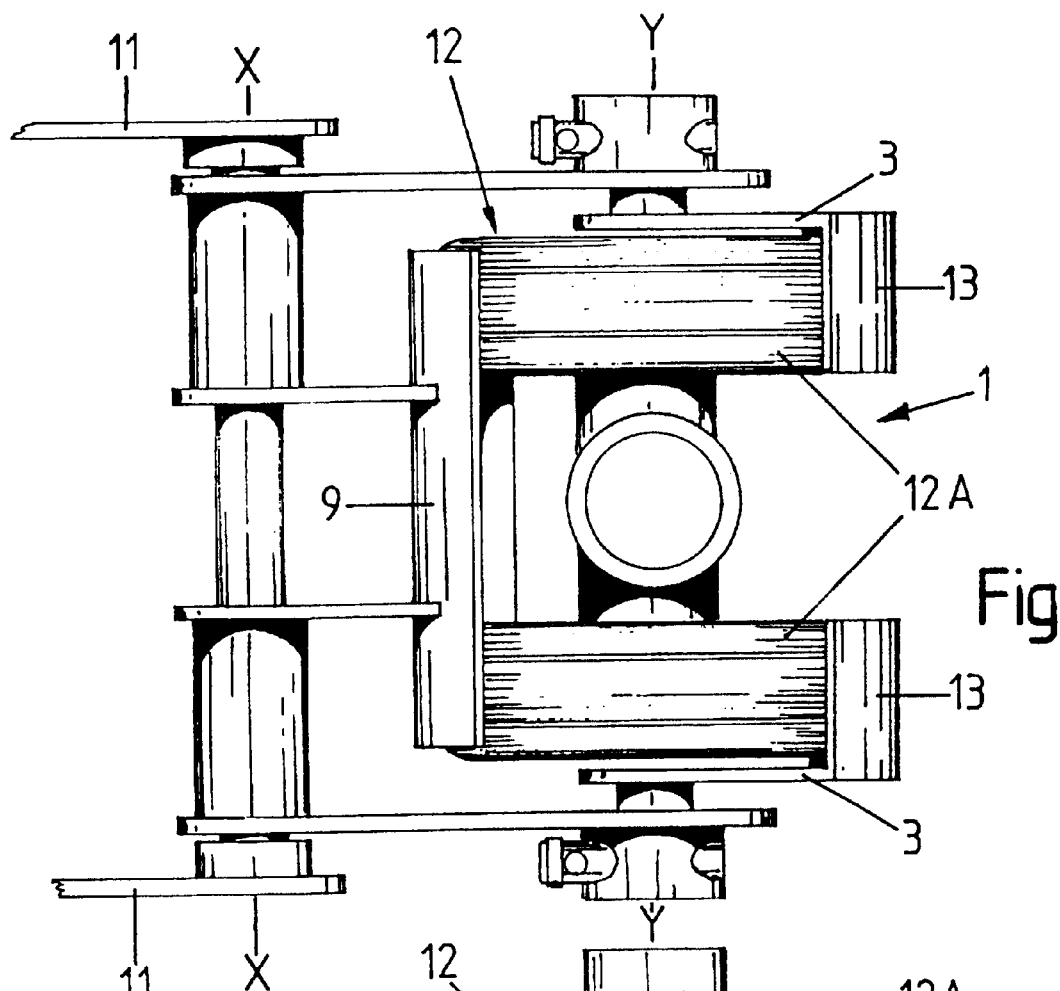
FIG. 6 is a plan view of the device of FIG. 1 in a further operating condition.

Referring now to the drawings and more particularly to FIGS. 1–10 there is shown an aircraft-wheel lifting device, according to various aspects of the present invention. In accordance within one embodiment, as shown in FIGS. 1–8, there is provided a device for lifting a twin nosewheel of an aircraft. The device comprises a structure 1 mounted to chassis members 11 of an aircraft ground handling vehicle (e.g., of a conventional type) for rotation about a transverse axis X—X which is substantially horizontal in the normal condition of device use, and which is defined by two main supporting trunnions 2 located within bearing housings 10 on the chassis members. A shaft 21 extends coaxially between the two trunnions and two sleeves or collars 6 are fixed to the shaft adjacent its opposite ends.

One end of a respective side member 7 is fixed to the outer end of each collar 6 and one end of a respective support arm 8 is fixed to the inner end of each collar. The side members and support arms project in the same direction, generally away from axis X—X and, being fast with the collars which are themselves fixed to the shaft, are rotatable together about that axis.

At their free ends, that is, at the ends opposite the collars, each side member and the two support arms carry respective wheel supports 13, 9. The two support arms together carry a fixed wheel support 9 which extends transversely over a substantial part of the distance between the two side members. The side members carry respective movable wheel supports 13 attached to support plates 3 which are rotatable, by means of trunions 5, in respective bearing housings 4. The housings are aligned on a common transverse axis Y—Y adjacent the free ends of the side members. According to one aspect of the present invention, axis Y—Y is generally parallel to axis X—X. The fixed wheel support and the rotatable wheel supports define respective curved support surfaces which are concentric with axis of rotation Y—Y of the rotatable supports.

Although the present invention is generally shown and described in connection with a twin nosewheel having a fixed wheel support and rotable wheel supports, it is appreciated that other orientations and configurations may be utilized within the spirit and scope of the present invention.

In use, it is preferred that the device be first aligned with a twin nosewheel unit 12 of an aircraft, as shown in FIG. 3, such as by maneuvering the aircraft ground handling vehicle. The device is then moved toward the nosewheel unit until two wheels 12A thereof are located in a bifurcated structure formed by the two side members and rest firmly against the curved surface of the fixed wheel support, as shown in FIGS. 4 and 5. In this condition, rotatable wheel supports 13 are disposed in a position in which they overlie fixed wheel support 9, radially and outwardly thereof with slight clearance, to permit placement of the support firmly against wheels 12A.

When the nosewheel unit is properly positioned against fixed wheel support 9, the two wheels operate respective pressure sensitive switches or pads 16 on the surface of the fixed wheel support to enable rotation of the rotatable wheel supports, without interfering with the tyres of the wheels. As illustrated generally in broken outline in FIG. 5 and in FIGS. 6 and 7, the wheel supports rotate through an obtuse angle, preferably of about 180°, relative to the fixed wheel support, swinging over the wheels on either side of the central strut of the nosewheel unit. The rotatable wheel supports thus move from the configuration of FIGS. 3, 4 and 5, in which the fixed and rotatable wheel supports are disposed on the same side of the nosewheel unit, to the configuration of FIGS. 6 and 7, where supports 9, 13 are disposed on opposite sides of the wheels, with the curved surfaces of the rotatable supports in engagement with portions of the circumferences of wheels 12A, opposite those portions of the circumferences located against the fixed support. In this configuration, the wheels are cradled by supports 13, 9.

Figure 7:
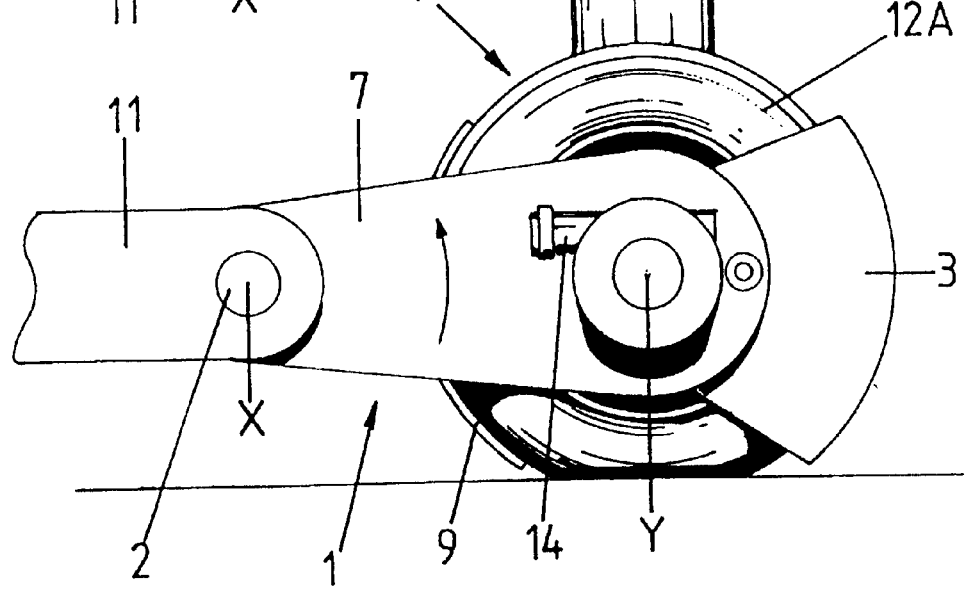
FIG. 7 is a side view of the device of FIG. 1 in the further operating condition.
Figure 8:
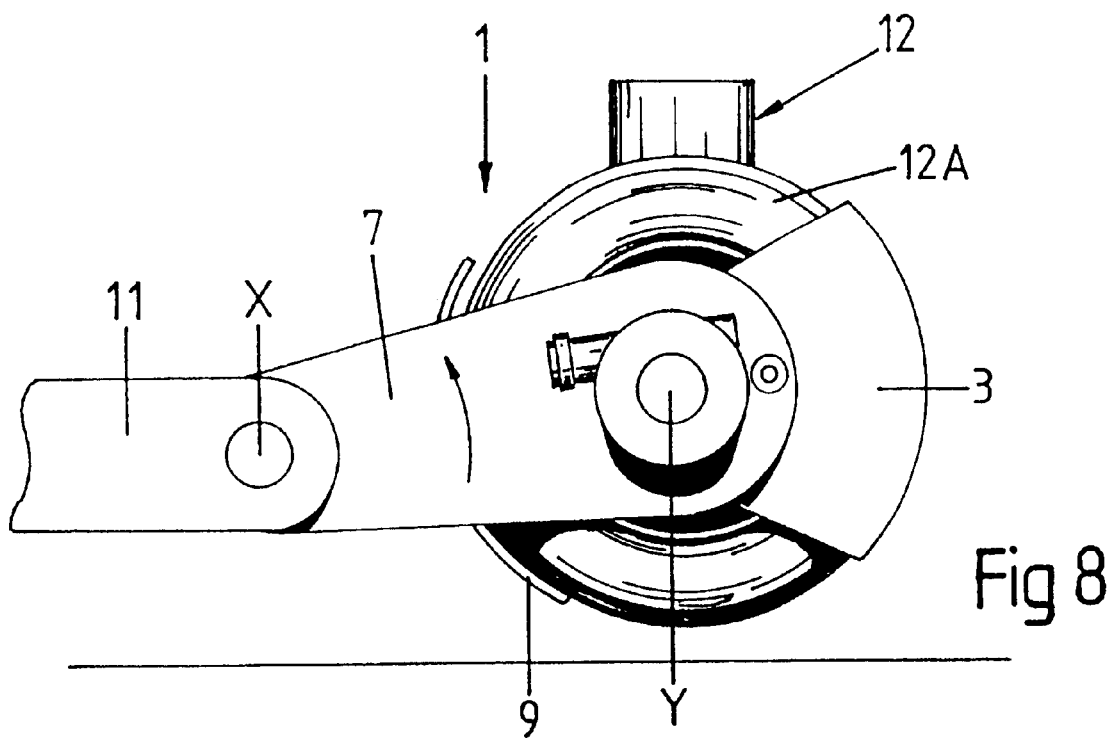
FIG. 8 is a side view of the device of FIG. 1 in yet another operating condition.
Figure 9:
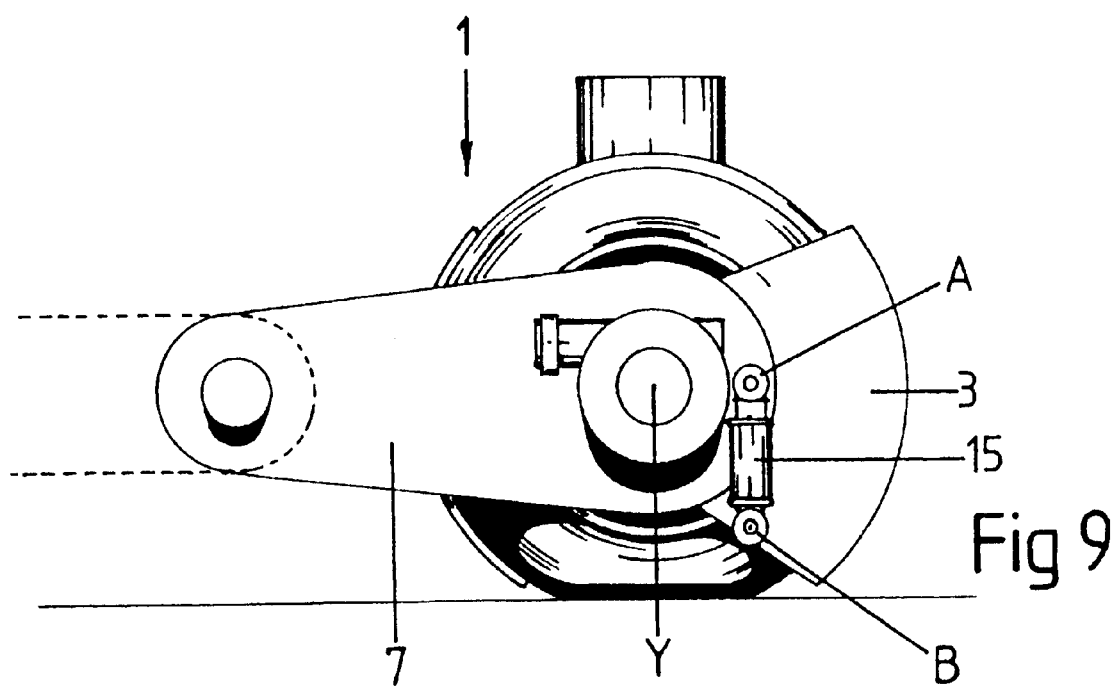
FIG. 9 is a side view, corresponding to FIG. 8, showing a variant of the device in FIG. 1.

Once the configuration of FIGS. 6 and 7 has been attained, the device is raised relative to the aircraft handling machine, as shown in FIG. 8, to lift the nosewheel unit clear of the ground so that the aircraft, for example a helicopter, can be readily maneuvered by the ground handling vehicle. With the nosewheel unit in a raised position, some of the aircraft weight bears on the ground handling vehicle, increasing friction between the drive wheels of the vehicle and the ground, and helping to prevent slippage between the wheels and the ground.

Rotatable wheel supports 13 are rotated by rotary actuators 14, for example, of the rack-and-pinion type in which the rack is constituted by the rod of the actuator and the pinion is connected to or formed on trunnion 5 of support plate 3. The raising and lowering of the device relative to the ground handling vehicle may be effected by actuators acting, for example, between chassis members 11 and shaft 21 but, in an alternative arrangement shown in FIG. 9, this raising and lowering may be effected by an actuator 15 attached at A to one of side members 7 and attached at B to an extension (not shown) of one of the chassis members. In order to prevent the device from being raised until the rotatable wheel supports are safely in the configuration of FIGS. 6 and 7, a microswitch (not shown) or the like, which, when open, disables the actuators for raising the device, may be provided in a position where it can be closed by supports 13 to enable those actuators only when the supports are in the proper position.

Inner supports 8 may be variable in length by means of hydraulic cylinders so that fixed wheel support 9 can be moved in a horizontal plane (in the normal condition of use) to compensate for any variation in the diameters of different aircraft nosewheels. Alternatively or in addition, the fixed wheel support is slidable on the inner supports, such as by means of a hydraulic actuator, so that the fixed support can be moved toward the wheels, if necessary to compensate for the gap which may open at the top of the fixed support, as shown in FIG. 8, and thus prevent the wheel from dropping slightly when the device is raised. Alternatively or concurrently therewith, supports 13 may be movable relative to plates 3, or bearing housings 4 may be longitudinally adjustable in side members 7, in order to maintain axis Y—Y substantially in common with the axis of the wheels.

In order to provide greater flexibility of use with aircraft wheels of different diameters, particularly the ability to vary spacing between the wheel supports referred to above, curved support surfaces 9, 13 may be replaced with laterally-extending pins or dowels 22, 23, as shown in FIG. 10. The pins may be rotatably mounted or may carry rotatable sleeves to prevent any undue chafing against the tyre surface in use.

The present invention advantageously provides ready lifting of an aircraft nosewheel assembly and improved transport of aircraft, which is not only suitable for use in confined (and unconfined) areas, but also durable, reliable and economical.

Various modifications and alterations to the present invention may be appreciated based on a review of this disclosure. These changes and additions are intended to be within the scope and spirit of this invention as defined by the following claims.

What is claimed is:

1. A device for lifting an aircraft wheel assembly, which comprises first and second wheel-engaging supports connectable to a bearing structure and rotatable relative to one another between open and wheel-cradling, configurations, the device further comprising an actuator connected to the bearing structure to enable raising or lowering of the supports relative to the ground when in the wheel-cradling configuration, the first wheel support being attached to inner support arms which extend forwardly from a pivotable shaft carried by the bearing structure and the second wheel support being attached to outer support arms which also extend forwardly from the pivotable shaft, the second wheel support including two laterally spaced-apart supports carried on a common axis of rotation (X—Y) for rotational movement in unison from a first position forwardly of the wheel to a second position rearwardly of the wheel to respectively define the open and wheel cradling configurations, and further, the outer support arms defining a bifurcated twin-wheel receiving space and the first wheel support extending transversely over a substantial part of the distance between the outer support arms, whereby in use the first wheel support supports both wheels of a twin wheel unit and each support of the second wheel support supports a respective one of the twin wheels.

2. The device set forth in claim 1 wherein the supports are pivotably attached to the bearing structure about a transverse horizontally-disposed axis (X—X).

3. The device set forth in claim 1 wherein the second wheel support is rotatably attached to the first support about a transverse horizontally-disposed axis (Y—Y).

4. The device set forth in claim 3 wherein the wheel engaging supports comprise wheel support surfaces.

5. The device set forth in claim 4 wherein the wheel support surfaces are curved about an axis which corresponds substantially with the axis of the second wheel support (Y—Y).

6. The device set forth in claim 1 wherein the wheel-engaging supports comprise laterally-disposed and vertically spaced-apart pins which optionally carry rotatable sleeves.

7. The device set forth in claim 6 wherein the pins carry rotatable sleeves.

8. The device set forth in claim 1 wherein the second wheel support radially overlies the first wheel support in the open configuration.

9. The device set forth in claim 1 further including, a pressure-sensitive switch carried by the first wheel support and operatively connected to the second wheel support to actuate rotation thereof when the aircraft wheels are in position against the first wheel support.

10. The device set forth in claim 1 wherein two pressure-sensitive switches are positioned laterally spaced apart on the first wheel support to be actuated by respective wheels of the aircraft twin wheel unit to enable rotation of the second wheel support only when the twin wheel unit is correctly located against the first wheel support.

11. The device set forth in claim 1 wherein the first wheel-engaging support is horizontally adjustable on its respective support arms to vary its distance from the axis of rotation (Y—Y) of the second support, whereby to compensate for aircraft wheels of different diameter.

12. The device set forth in claim 1 wherein the second wheel-engaging support is horizontally adjustable on its respective support arms to vary its distance from an axis of rotation (Y—Y) of the second support, whereby to compensate for aircraft wheels of different diameter.

13. The device set forth in claim 1 wherein the first and second wheel-engaging supports are horizontally adjustable on their respective support arms to vary their distance from an axis of rotation (Y—Y) of the second support, whereby to compensate for aircraft wheels of different diameter.

14. An aircraft ground handling machine including a device for lifting a wheel assembly of an aircraft, which comprises wheel-engaging supports connectable to a bearing structure and rotatable relative to one another between open and wheel-cradling configurations, the device further comprising an actuator connected to the bearing structure to enable raising or lowering of the supports relative to the ground when in the wheel-cradling configuration, a first wheel-engaging support being attached to inner support arms which extend forwardly from a pivotable shaft carried by the bearing structure and a second wheel support being attached to outer support arms which also extend forwardly from the pivotable shaft, the second wheel-engaging support including two laterally spaced-apart supports carried on a common axis of rotation (X—Y) for rotational movement in unison from a first position forwardly of the wheel to a second position rearwardly of the wheel to respectively define the open and wheel cradling configurations, and further, the outer support arms defining a bifurcated twin-wheel receiving space and the first wheel support extending transversely over a substantial part of the distance between the outer support arms, whereby in use the first wheel support supports both wheels of a twin wheel unit and each support of the second wheel support supports a respective one of the twin wheels.

15. A method for lifting an aircraft wheel assembly using a device which comprises first and second wheel-engaging supports connectable to a bearing structure and rotatable relative to one another between open and wheel-cradling configurations, the device further comprising an actuator connected to the bearing structure to enable raising or lowering of the supports relative to the ground when in the wheel-cradling configuration, the first wheel support being attached to inner support arms which extend forwardly from a pivotable shaft carried by the bearing structure and the second wheel support being attached to outer support arms which also extend forwardly from the pivotable shaft, the second wheel support including two laterally spaced-apart supports carried on a common axis of rotation (X—Y) for rotational movement in unison from a first position forwardly of the wheel to a second position rearwardly of the wheel to respectively define the open and wheel cradling configurations, and further, the outer support arms defining a bifurcated twin-wheel receiving space and the first wheel support extending transversely over a substantial part of the distance between the outer support arms, whereby in use the first wheel support supports both wheels of a twin wheel unit and each support of the second wheel support supports a respective one of the twin wheels, the method comprising the steps of:

a. aligning the device with a nosewheel unit of an aircraft, b. moving the device toward the nosewheel unit until at least one wheel of the unit is located in a selected position, resting firmly against a curved surface of at least one of the wheel supports; and c. upon resting against the support, engaging a pressure sensitive switch and actuator, causing rotation of one of the wheel supports, through an obtuse angle relative to the other support, and over the wheels so as to place the unit in a raised position for ready ground handling.

* * * * *